US012246262B2

(12) United States Patent
Meunier et al.

(10) Patent No.: US 12,246,262 B2
(45) Date of Patent: Mar. 11, 2025

(54) ILLUMINATED SUPPORT RAILS FOR PINBALL MACHINES

(71) Applicants: Eric M. Meunier, Oak Park, IL (US); Daniel E. Molter, Elmhurst, IL (US); Keith P. Johnson, South Elgin, IL (US); Duncan F. Brown, Mundelein, IL (US)

(72) Inventors: Eric M. Meunier, Oak Park, IL (US); Daniel E. Molter, Elmhurst, IL (US); Keith P. Johnson, South Elgin, IL (US); Duncan F. Brown, Mundelein, IL (US)

(*) Notice: Subject to any disclaimer, the term of this patent is extended or adjusted under 35 U.S.C. 154(b) by 112 days.

(21) Appl. No.: 17/494,829

(22) Filed: Oct. 5, 2021

(65) Prior Publication Data

US 2022/0105423 A1 Apr. 7, 2022

Related U.S. Application Data

(60) Provisional application No. 63/087,796, filed on Oct. 5, 2020.

(51) Int. Cl.
*A63F 7/36* (2006.01)
*A63F 7/02* (2006.01)
(Continued)

(52) U.S. Cl.
CPC ................ *A63F 7/36* (2013.01); *A63F 7/027* (2013.01); *F21S 4/28* (2016.01); *F21V 19/003* (2013.01);
(Continued)

(58) Field of Classification Search
CPC ........ A63F 7/36; A63F 7/027; F21S 4/20–28; F21W 2121/002; Y10S 362/806
See application file for complete search history.

(56) References Cited

U.S. PATENT DOCUMENTS 6,494,591 B1 * 12/2002 Guimond .................. F21S 4/20 362/237
6,796,680 B1 * 9/2004 Showers .............. H01R 25/162 362/240
(Continued)

OTHER PUBLICATIONS

Pederetti Gaming, "How to install | Cirqus Voltaire neon mod" https://www.youtube.com/watch?v=sAIZUeCNIc0 (Year: 2018).*

*Primary Examiner* — Tracie Y Green
*Assistant Examiner* — Michael Chiang
(74) *Attorney, Agent, or Firm* — Marsh IP Law

(57) ABSTRACT

Support rails are provided for pinball machine playfields that provide mechanical support as well as light-emitting elements, such as LEDs, that generate additional light for illuminating the playfield and/or decorative features affixed to the rails. At least a portion of the support rail is preferably made of a transparent or translucent material to facilitate transmission of light from lighting elements below or enclosed by the rail. The support rails can be provided with various grooves, channels, and holes to facilitate mounting of the rails to a playfield or an existing support rail, using nuts and bolts, screws, brackets, and the like. The lighted support rails provide both mechanical stability to the playfield, as well as additional illumination and optional mounting locations for decorative features and/or game mechanisms. These functions of the support rail can be achieved without taking up room on the 'active' area of the playfield itself or obstructing visibility of the playfield and its components.

14 Claims, 7 Drawing Sheets

(51) Int. Cl.

| | |
|---|---|
| ***F21S 4/28*** | (2016.01) |
| ***F21V 19/00*** | (2006.01) |
| ***F21V 33/00*** | (2006.01) |
| *A63F 9/24* | (2006.01) |
| *F21Y 115/10* | (2016.01) |

(52) U.S. Cl.

CPC .... *F21V 33/008* (2013.01); *A63F 2009/2454* (2013.01); *F21Y 2115/10* (2016.08)

(56) References Cited

U.S. PATENT DOCUMENTS

| | | | | | |
|---|---|---|---|---|---|
| 7,213,941 | B2 * | 5/2007 | Sloan | F21S 4/20 | 362/240 |
| 7,857,482 | B2 * | 12/2010 | Reo | F21V 29/70 | 362/225 |
| 8,556,452 | B2 * | 10/2013 | Simon | F21K 9/68 | 362/223 |
| 10,788,170 | B1 * | 9/2020 | Bryan | H05B 45/10 | |
| 10,865,951 | B2 * | 12/2020 | Zhong | F21V 23/02 | |
| 2003/0021115 | A1 * | 1/2003 | Sloan | F21S 8/032 | 362/240 |
| 2003/0210546 | A1 * | 11/2003 | Chin | F21V 21/02 | 362/240 |
| 2015/0091250 | A1 * | 4/2015 | Popadiuk, Jr. | A63F 7/025 | 273/121 R |
| 2015/0181677 | A1 * | 6/2015 | Martinez | G08C 17/02 | 362/145 |
| 2017/0023192 | A1 * | 1/2017 | Moita | F21V 21/0824 | |
| 2017/0138586 | A1 * | 5/2017 | Finch | F21V 33/008 | |
| 2017/0350565 | A1 * | 12/2017 | Hartman | F21S 4/20 | |
| 2020/0018451 | A1 * | 1/2020 | Signorino | F21V 7/005 | |

* cited by examiner

ILLUMINATED SUPPORT RAILS FOR PINBALL MACHINES

BACKGROUND INFORMATION

The pinball industry has exhibited a resurgence in recent years, with several new companies producing new machines. It has also become a collector's hobby, with many people now buying new and older games for home use.

A typical pinball machine includes a substantially rectangular wooden cabinet standing on four corner legs, with an inclined flat playfield mounted within the cabinet and a glass sheet enclosing the upper surface of the cabinet. A vertical box structure, referred to as a backbox, is typically mounted at the rear of the cabinet. The backbox can contain a panel of static artwork (e.g., a backglass or translite), one or more displays to show scores, describe game features and/or animated or varying artwork, and speakers for audio effects. The backbox can also contain additional components such as control circuitry, lighting elements, power components, and the like.

A conventional playfield 100 is illustrated in FIG. 1. The playfield 100 is typically made of a single sheet of plywood, with a decorative upper surface and various mechanisms mounted to the surface or through cutouts in the playfield 100. Such mechanisms can include, e.g., flipper mechanisms, pop bumpers, various types of targets, ramps, posts, guide rails for ball movement, and even smaller playfields mounted above or below the main playfield, as well as wiring to power and control the various mechanisms. For clarity, these mechanisms are not shown on the playfield 100 of FIG. 1. The playfield 100 provides an inclined surface for one or more pinballs to roll over, with user-controlled flippers being activated to keep the balls in play and direct them at various targets and playfield features to increase score and activate various scoring modes. The playfield 100 is typically mounted in a pivotal manner within the cabinet, such that the front portion of the playfield can be lifted to access components within the cabinet and those mounted to or projecting through the bottom of the playfield 100. Such access facilitates maintenance and/or replacement of the game components.

A thin wooden rail 110 (e.g., a "side rail," "siderail," or "support rail") is typically provided along at least a portion of each side of the playfield 100 in modern games, and is affixed to the upper surface of the playfield 100. Such support rail 110 can provide important mechanical stability to the playfield 100, and act as a barrier to protect playfield components near the edge of the playfield 100 from contacting the insides of the cabinet when the playfield 100 is raised or lowered. The mechanical support is important in pinball machines, as the plywood playfields 100 often have many heavy components affixed to them, and there are also cutouts or holes present in almost every playfield 100 to allow mounting of components passing through the playfield, such as pop bumpers, targets, acid other devices. Because the wooden playfields 100 are precisely shaped and routed, contain painted or printed artwork on the top surface, and are often clearcoated to protect the graphics and wood beneath, they can be costly and time-consuming to produce. It is important to provide mechanical stability and support to maintain a stable and flat playing surface. Accordingly, it is standard practice to provide support rails 110 (typically made of wood) along the sides of the playfield 100 in pinball machines.

Further, illumination of pinball machines is very important so that players and observers may see the ball in action.

As ambient lighting can vary greatly, pinball machines are designed to provide lighting elements to illuminate the playfield and various features on the machine. Historically, this was done with incandescent light bulbs mounted below the playfield 100, and above the playfield 100 in areas protected from direct contact with a moving pinball. As technology improved, light-emitting diodes (LEDs) have played a more prominent role in illuminating pinball machines. Such LEDs can be provided, e.g., in the form of bulb-shaped units insertable into sockets, or as surface-mounted on strips or circuit boards.

LEDs or bulbs mounted below transparent/translucent plastic pieces embedded in the playfield and flush with the playfield surface (known in the industry as playfield inserts) can be controlled to indicate various scoring features and other gameplay aspects. In modern games, the color of the LEDs that illuminate playfield inserts can also be controlled to provide even more levels of scoring and gameplay information to a player. However, illumination of such inserts does not provide direct lighting of the upper playing surface, as the light source lies beneath the playfield 100.

Bulbs or LEDs are often provided above the playfield 100, located under translucent plastic panels, behind plastic posts, metal lane guides, or rubber bumpers to illuminate the decorative panels as well as nearby areas of the playfield 100 directly. Additionally, many modern games are provided with one or more small "spotlights" that include a bulb or LED mounted on a small post affixed to the playfield 100, typically with a small conical reflector surrounding the bulb or LED to direct light to a particular part of the playfield 100. Because of the number of objects provided on a playfield 100, it is often desirable to add additional lighting. Many 3rd parties supply brighter bulbs or LEDs that can be swapped into existing lighting components, as well as additional light sources such as spotlights that can be affixed to playfield hardware and wired into existing power sources on the playfield 100. Such additional lighting is often desirable to improve visibility during playing and to allow customization of factory games.

Together with an increase of the number of machines located in private homes, customization of games has become increasingly popular. Such customization includes addition of accessories, such as decorative plastic figurines, which are sold by many game manufacturers and third parties and can be mounted to various components on the playfield. Another form of customization involves the addition of further light-emitting elements, which may be located on or inside mounted figurines, and/or in other configurations. Such aftermarket accessories and lighting elements are often designed to attach to existing hardware components and to be wired into power sources that may be located below the playfield or in other user-accessible locations.

Pinball playfields 100 have a limited size that is fairly standard in the industry, with the width of common playfields 100 being about 20 inches and "widebody" games having a playfield width of about 23 inches. Considerations such as ball travel area and mechanical device footprints can limit the amount of area where lighting can be placed and accessories can be mounted, possibly leaving certain areas of the playfield undesirably dark. Further, certain discrete lighting components, such as LED spotlights, can lead to a cluttered appearance of the playfield area and obstruct visibility of parts of the playing surface. Accordingly, there may be a need for an apparatus that can provide playfield support, additional lighting, and mounting options for accessories and mechanisms, without impacting the available area on the playfield dedicated to ball movement and game features. Such an apparatus could address and/or overcome at least some of the deficiencies or issues described herein above.

SUMMARY OF THE DISCLOSURE

Embodiments of the disclosure provide support rails for the sides of pinball machine playfields that provide mechanical support as well as light-emitting elements, such as LEDs. The rails can be provided with a lower T-shaped channel to facilitate attachment of the rail to the playfield using nuts and bolts or other fasteners. The rails can also be mounted to the playfield using other fastening arrangements, such as brackets or adhesives. In some embodiments, a rail can be configured to be affixed to an existing (generally wooden) support rail, using adhesives, screws, or the like.

The disclosed support rails are configured to house one or more light-emitting elements, which may be provided in the form of a thin strip on which a plurality of LEDs are mounted together with appropriate wiring or conductors to provide power and optionally control characteristics of the LEDs. Such light-emitting components, e.g. light strips, can be provided within channels or grooves that extend along at least a portion of the rail in a longitudinal direction. At least a portion of the support rail is preferably made of a transparent or translucent material to facilitate transmission of light from the lighting elements provided in channels or grooves formed in the rail.

In some embodiments, both the heads of mounting bolts and a light strip can be provided in a T-shaped channel at the bottom of the rail. In other embodiments, a bracket can be used to affix the rail to the playfield, and light strips can be provided in one or more channels or grooves formed in the rail. In further embodiments, a mounting strip having a light strip on the upper surface and studs affixed to the lower surface can be provided in a lower T-shaped channel of the rail, to facilitate simultaneous mounting of the rail and provision of lighting elements in the rail.

The support rails can be provided with a conventional rectangular cross section, or they may have other cross-sectional shapes. In some embodiments, reflective coatings or materials can be provided on one or more surfaces of the rail, including interior surfaces of grooves or channels if present. Such reflective elements can be configured to direct a portion of the light from the light strips onto the playfield or onto/through decorative objects or playfield mechanisms.

In some embodiments, channels can be provided on an upper surface and/or side of the rail to serve as mounting points for decorative objects and/or playfield mechanisms. Light from certain portions of the light strips can be configured and optionally controlled to direct light onto such mounted objects, or through them if the objects are made from transparent or translucent materials. Threaded holes or holes having other shapes can also be provided in the rail to serve as mounting locations for decorative or functional components.

The disclosed lighted support rails provide both mechanical stability to the playfield, as well as additional illumination and optional mounting locations for decorative features and/or game mechanisms. Channels or grooves used to affix the rail to the playfield, and to mount objects to the rail, provide flexibility in locating mounting components or mounted objects along the length of the rail. Such configurations also simplify replacement of the rail and associated components such as light strips and decorative objects. These functions of the support rail can be achieved without taking up room on the 'active' area of the playfield itself or obstructing visibility of the playfield and its components.

BRIEF DESCRIPTION OF THE DRAWINGS

Further objects, features and advantages of the disclosure will become apparent from the following detailed description taken in conjunction with the accompanying figures showing illustrative examples, results and/or features of the exemplary embodiments of the present disclosure, in which.

The various embodiments of the disclosure are described herein with reference to the figures, where like reference numbers indicate identical or functionally similar elements. Further features and advantages of the disclosure as well as the structure and operation of various embodiments of the present disclosure are described in detail below with reference to the accompanying drawings. To the extent that the present disclosure does reference the figures, it is done so in connection with the illustrative embodiments and is not limited by the particular embodiments illustrated in the figures. It is intended that changes and modifications can be made to the described embodiments without departing from the true scope and spirit of the present disclosure.

DETAILED DESCRIPTION OF EXEMPLARY EMBODIMENTS

Embodiments of the present disclosure can provide side support rails for a pinball machine playfield that can facilitate improved illumination of the playing surface without obstructing playfield features. Support rails are already present on essentially all pinball playfields 100, and embodiments of the disclosure can be used to provide stability to the playfield 100 as well as to provide improved and unobtrusive illumination for pinball machines and the like. The disclosed support rails can provide certain benefits as described herein yet not interfere with ball movement or take up available space on the playfield 100. They can be substantially the same size as existing (e.g., wooden) support rails, while further providing a platform for easily mounting and/or relocating of illuminating elements and/or certain mechanisms or decorations in the machine, again without interfering with any available playfield area in the game.

Figure 1:
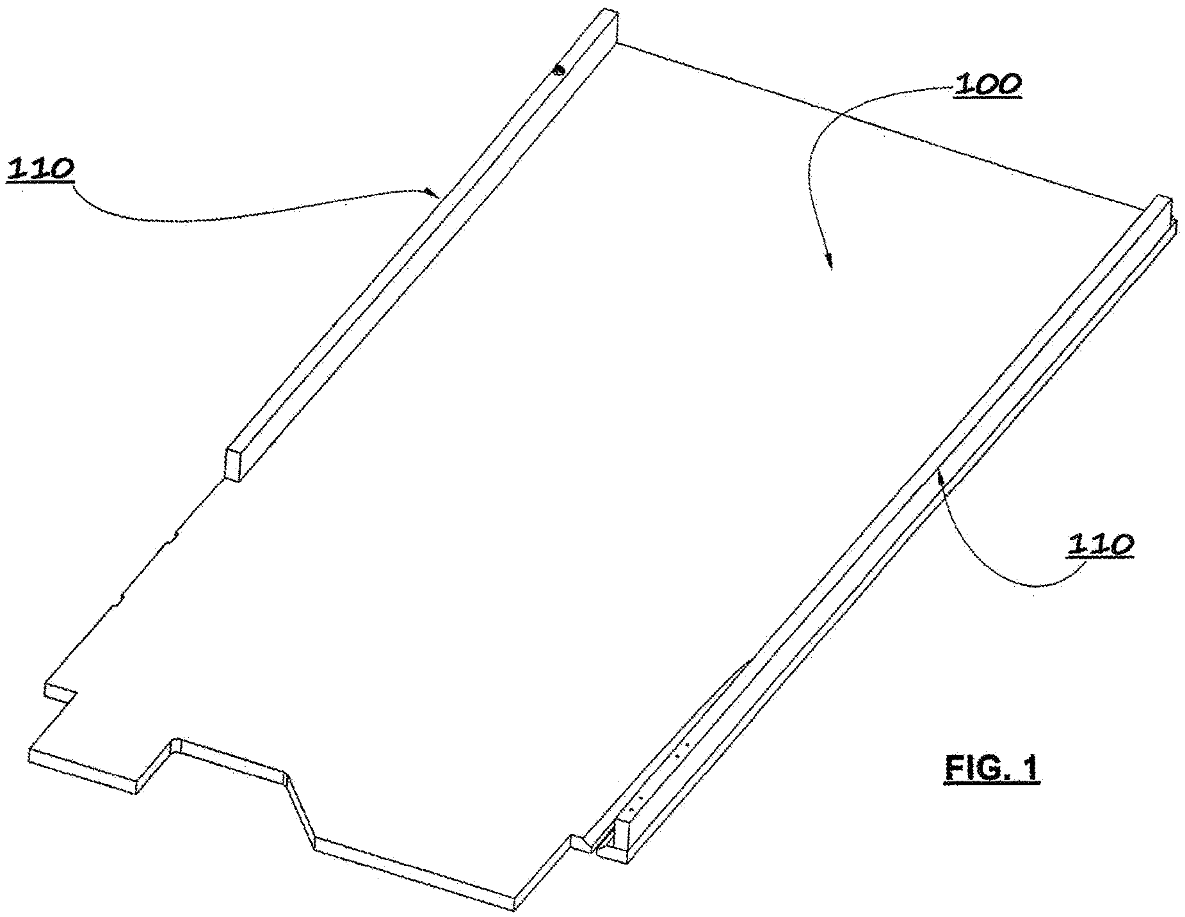
FIG. 1 illustrates a conventional pinball machine playfield with standard support rails.
Figure 2:
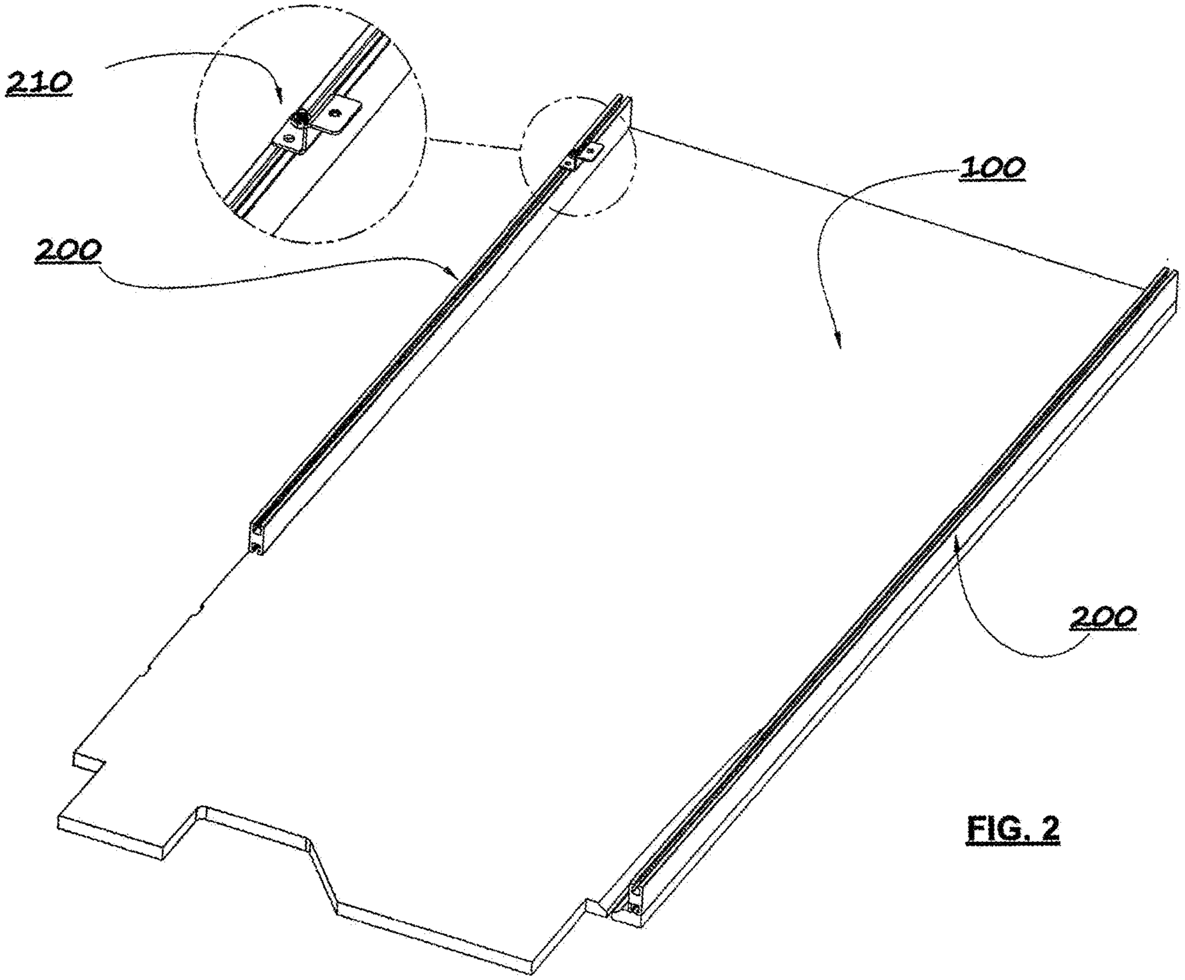
FIG. 2 illustrates a pinball machine playfield with support rails in accordance with certain embodiments of the disclosure.

An exemplary embodiment of the present disclosure is illustrated in FIG. 2, which shows a conventional playfield 100 with two attached side rails 200 in accordance with certain embodiments of the disclosure. The support rails 200 can extend along the entire length of the playfield 100 or, optionally, along a substantial portion thereof to provide stability to the playfield 100. The support rail 200 can made at least in part from a material such as plexiglass or another transparent or translucent material, including other acrylic plastics, which can facilitate transmission of light. Acrylic materials used to form support rails 200 can either be extruded or cell cast. Other clear or translucent plastics, such as polycarbonates, can also be used to form the support rails described herein. Each type of plastic and forming process may exhibit certain advantages with respect to the others, e.g., in terms of clarity, cost, hardness, discoloration, formability, etc. Advantages of support rails 200 that can transmit light are described in more detail below.

Figure 3A:
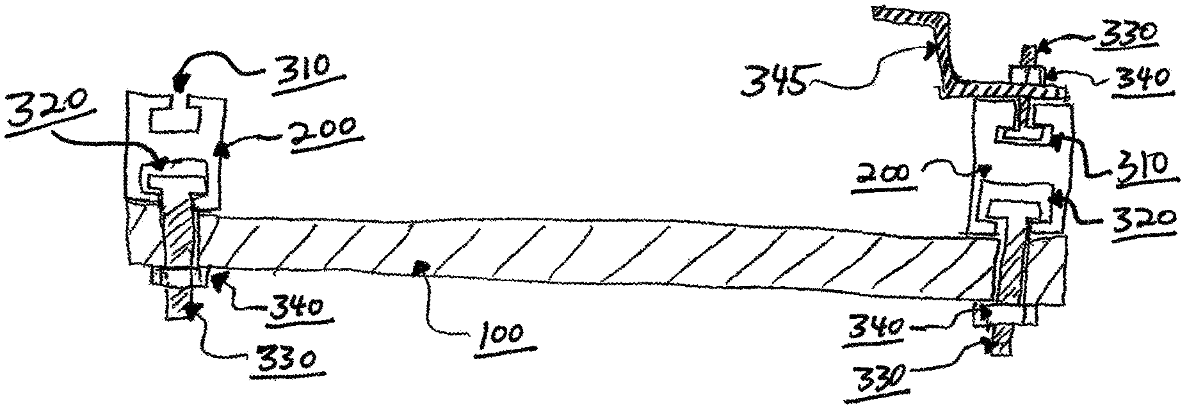
FIG. 3A is a cross-sectional view of a playfield with support rails attached in accordance with certain embodiments of the disclosure.
Figure 3B:
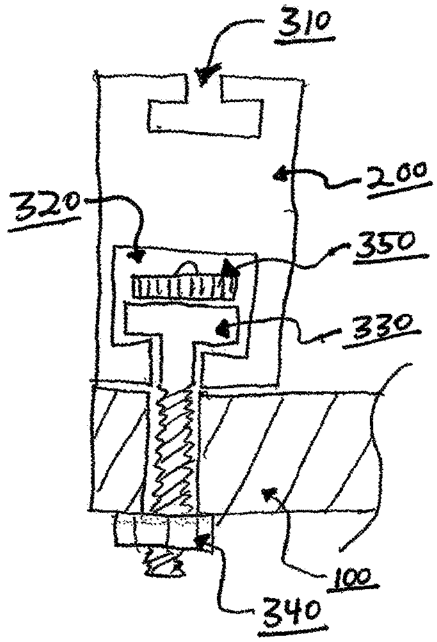
FIG. 3B is a cross-sectional view of a portion of a playfield with a support rail attached that includes a lighting arrangement.

In some embodiments, the support rails 200 can be provided as long, substantially rectangular bars of clear or translucent plastic having both an upper channel 310 and a lower channel 320 formed longitudinally along at least a portion of the length of the support rail 200, as shown in cross section in FIGS. 3A and 3B. The channels 310, 320 can be formed as part of such support rails 200 or routed/machined into solid pieces. These channels 310, 320 can be T-shaped in cross section as illustrated, thereby facilitate mounting of the support rails 200 to the playfield 100, as well as to provide an accessible base to mount lighting elements, playfield mechanisms, and/or decorative accessories to the upper portion of the support rail 200. The support rail 200 can be affixed to the playfield 100 in any one of a variety of ways, and it can be formed using various materials and in a variety of geometries to provide certain benefits, as detailed in the several embodiments described herein. Typically, a pinball machine can be provided with two such support rails 200, with a support rail 200 affixed to the upper surface of both the left and right edges of the playfield 100, as is done with conventional support rails 110.

A cross-section of the playfield 100 with support rails 200 affixed along both sides is shown in cross section in FIG. 3A. The head of a mounting bolt 330 can be inserted into the lower T-shaped channel 320 of the support rail. The shaft of the bolt 330 can pass through a hole in the playfield 100, and a nut 320 (and optional washer) can be provided on the bolt 330, below the playfield 100, to secure the support rail 200 to the playfield 100. A plurality of such mounting bolts 330 can be used to secure the support rail 200 to the playfield 100. In further embodiments, the mounting bolt 330 can be reversed so the head of the bolt 330 is placed below the playfield 100, and the nut 340 can be provided within the lower T-shaped channel 320 of the support rail 200. In some embodiments, strips of metal or other strong materials (not shown) can be provided along the lower portion of the lower T-shaped channel 320, e.g., below the head of the bolt 330, to provide mechanical stability and strength to the support rail 200 when the mounting bolts 330 are tightened.

FIG. 3A shows another support rail 200 affixed along the right side of the playfield 100 in cross section. This support rail 200 has the head of a mounting bolt 330 inserted into the upper T-shaped channel 310 of the support rail. The shaft of this bolt 330 is used to secure a bracket 345 to the support rail 200 using the nut 340. The bracket 345 can be used to mount a decorative accessory (e.g. a 2-D or 3-D plastic figurine or the like), or a playfield mechanism (e.g. a spinner target suspended over the playfield 100, a ball guide, etc.) to the support rail 200. This attachment configuration is merely illustrative, and other known attachment arrangements and configurations can also be used to secure the bracket 345 or other objects to the support rail 200. A plurality of such mounting bolts 330 can be used to secure the support rail 200 to the playfield 100.

FIG. 3B shows a closer view of this exemplary mounting arrangement for the support rail 200. FIG. 3B also shows a light-emitting arrangement 350 (e.g., a "light strip") provided within the lower T-shaped channel 320, e.g., in the space above the head of mounting bolt 330. The light-emitting arrangements 350 that can be used in various embodiments of the disclosure can have the form of an elongated strip of material containing one or more light-emitting elements thereon, such as LEDs. The light strip 350 within the lower T-shaped channel 320 can extend along at least a portion of the support rail 200. Such light strips 350 can illuminate the interior of the support rail 200, such that at least a portion of the emitted light is directed towards the playfield 100 to provide indirect illumination to the playing area. In further embodiments, the light strip 350 (or, alternatively, a plurality of individual light-emitting elements) can be affixed to the upper surface of the lower T-shaped channel 320.

In any of the embodiments described herein, the light strips 350 can be configured such that individual LEDs or other light-emitting elements can be oriented in different directions on a light strip 350, e.g., to provide desired directionality and/or dispersion of light within the support rail 200. In one embodiment, a light strip 350 can include a plurality of LEDs and appropriate electrical connections such that the individual LEDs can be powered and optionally controlled by circuitry in the pinball machine when the light strip 350 is placed in the support rail 200. In a further embodiment, at least one of the LEDs in the light strip 350 can be an RGB LED arrangement, where the color and intensity of the emitted light can be controlled using conventional lighting control circuitry.

Figure 3C:
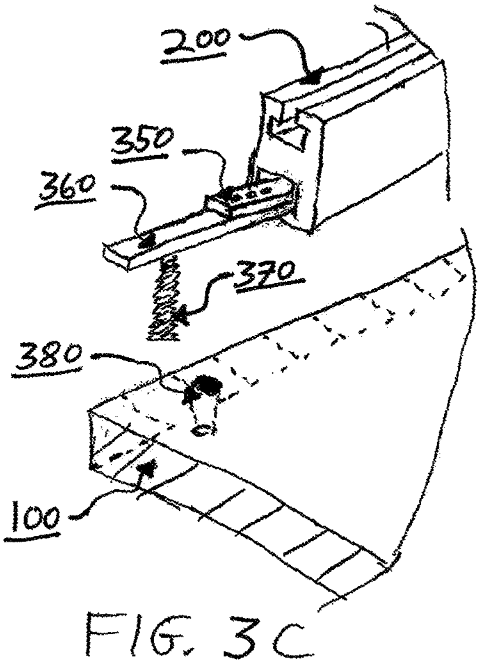
FIG. 3C is an illustration of a support rail and an arrangement for mounting the rail to a playfield.

In another embodiment, shown in FIG. 3C, a light strip 350 can be provided on a strip of metal 360 or other material that has one or more threaded studs 370 or other mounting hardware affixed to the lower surface thereof. In this embodiment, the light strip 350 can be configured to be inserted into the lower T-shaped channel 320 of the support rail 200, and the attached mounting hardware (e.g. threaded studs 370) can be configured to secure the support rail 200 to the playfield 100 through a hole 380 provided in the playfield 100, in a manner similar to that shown in FIGS. 3A-3B.

In some embodiments of the disclosure, the support rail 200 can be made at least in part from a light-transmitting (e.g., transparent or translucent) material, and the upper channel 310 in FIGS. 3A-3F can be omitted. In such embodiments, a light strip 350 provided in the lower channel 320 can illuminate portions (or all) of the support rail 200, thereby providing indirect illumination of the side regions of the playfield 100.

Figure 3D:
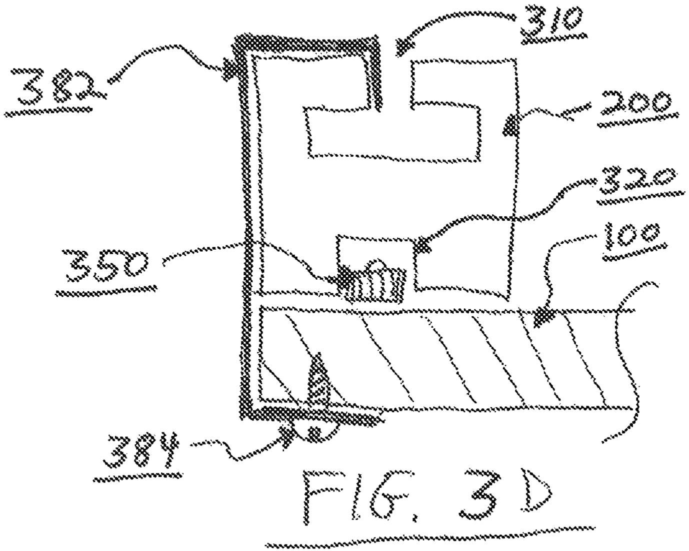
FIG. 3D is a cross-sectional illustration of a support rail mounted to a playfield using a bracket and having a bottom groove enclosing a lighting arrangement, in accordance with certain embodiments of the disclosure.

In an alternative embodiment, shown in FIG. 3D, a bracket 382 made of metal or other structural material can be provided and configured to affix the support rail 200 to the side of the playfield 100. In the cross-sectional view of FIG. 3D, a metal bracket 382 is shaped such that a portion of the bracket 382 extends over the top surface of the support rail 200 and optionally into the upper T-shaped channel 310 of the support rail 200, passes along the outer edge of the support rail 200 and of the playfield 100, and extends along an edge portion of the lower surface of the playfield 100. The bracket 382 can be affixed to the lower surface of the playfield 100, e.g., using screws 384 as shown in FIG. 3D or using other fastening arrangements. In this manner, the bracket 382 can provide additional strengthening of the support rail 200 and increase mechanical stability of the playfield 100, and also facilitate installation and removal of the support rail 200 if desired.

In the exemplary embodiment shown in FIG. 3D, because the lower channel 320 is not used to affix the support rail 200 to the playfield 100, the lower channel 320 need not be T-shaped, but instead can be a rectangular channel in which the light strip 350 can be inserted. This lower channel 320 can also have any of a variety of shapes in further embodiments, e.g., a triangular cross-section, a semi-circular cross-section, a polygonal cross-section, or the like. The cross-sectional shape of this lower channel 320 (or of the upper portion of the lower channel 320 in other embodiments) can be selected based on desired light transmission and/or dispersion properties of the transparent or translucent support rail 200.

Figure 3E:
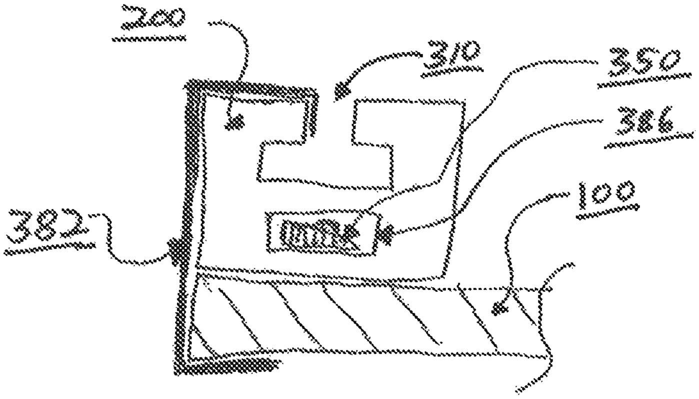
FIG. 3E is a cross-sectional illustration of a support rail mounted to a playfield using a bracket having and having a channel therethrough enclosing a lighting arrangement.

In a still further embodiment, shown in FIG. 3E, a lower channel 386 is provided as a substantially longitudinal hole that extends through at least a portion of the support rail 200 and does not intersect the bottom of the support rail 200. This longitudinal hole 386 can be configured to receive a light strip 350 and may have any one of a variety of cross-sectional shapes, where the shape can be selected based on the geometry of the light strip 350 (e.g., direction(s) in which the LEDs are facing on the light strip 350), and desired transmission and/or dispersion of the emitted light by the support rail 200.

In FIG. 3E, the exemplary light strip 350 is shown with an emitting surface that is, angled with respect to the surface of the playfield 100. Light strips 350 can be provided with one or more surfaces containing light-emitting elements that are directed in various orientations in further embodiments of the disclosure. Such orientations of the light-emitting elements (such as LEDs) can be selected to provide particular lighting effects and vary the intensity of visible light in different directions when the illuminated support rail 200 is used in a pinball machine.

Figure 3F:
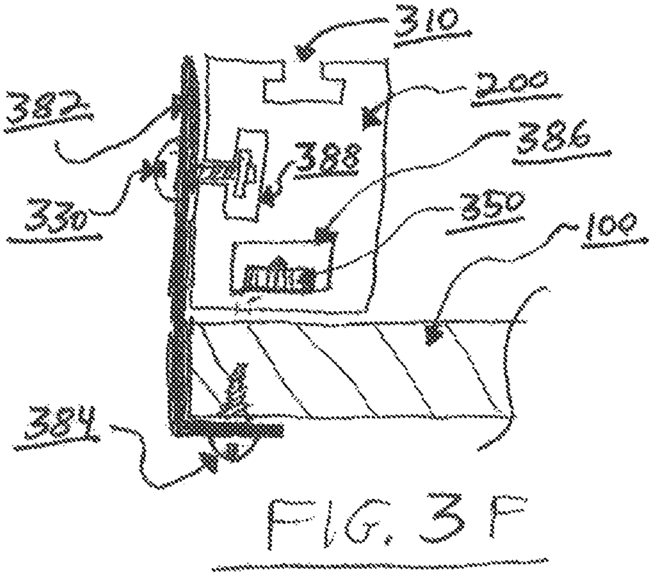
FIG. 3F is a cross-sectional illustration of a support rail mounted to a playfield using a bracket secured to a side of the support rail and having a channel therethrough enclosing a lighting arrangement.
Figure 4A:
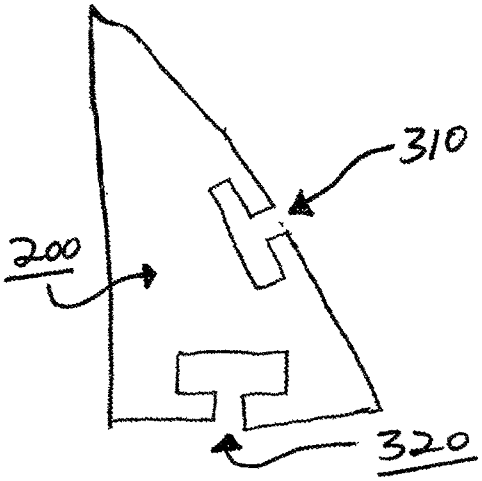
FIG. 4A is a cross-sectional illustration of a support rail having a non-rectangular shape and channels for mounting the rail and other features.
Figure 4B:
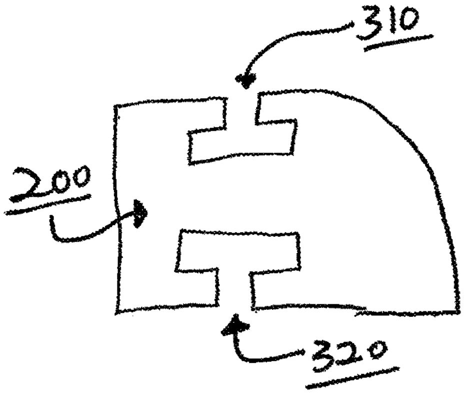
FIG. 4B is a cross-sectional illustration of a support rail having a different non-rectangular shape and channels for mounting the rail and other features.
Figure 4C:
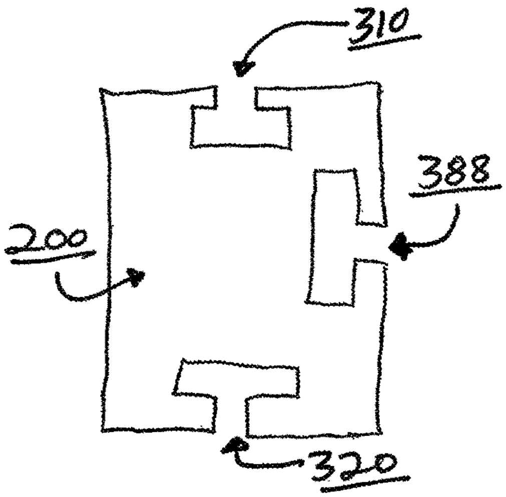
FIG. 4C is a cross-sectional illustration of a support rail having yet another non-rectangular shape and channels for mounting the rail and other features.
Figure 4D:
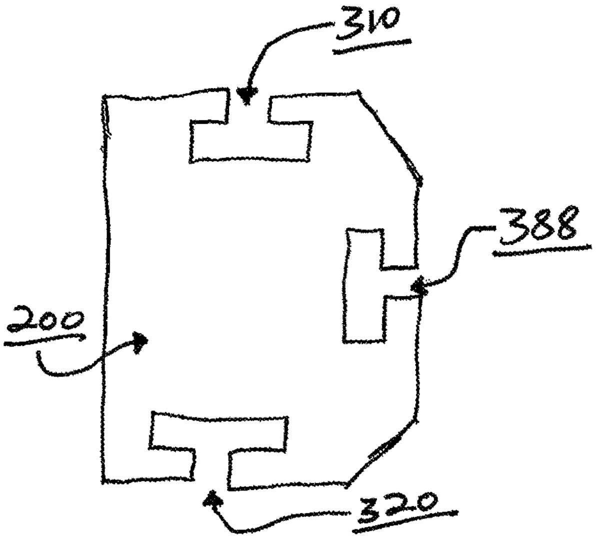
FIG. 4D is a cross-sectional illustration of a support rail having still another non-rectangular shape and channels for mounting the rail and other features.

In another embodiment, illustrated in FIG. 3F, a side channel 388 can be provided along at least a portion of the outer side of the support rail 200. This side channel 388 can be used to affix the support rail 200 to a metal bracket 382 that extends along at least a portion of the outer edge of the support rail 200, e.g., using a nut-and-bolt arrangement 330, 340 or similar attachment hardware. The side bracket 382 can extend beneath the edge of the playfield 100 and be affixed to the bottom of the playfield 100 using screws 384 as shown in FIG. 3F, or using similar attachment hardware or adhesives. In further embodiments (not illustrated), the side bracket 382 need not extend beneath the playfield 100 as shown in FIG. 3F, and instead can be affixed to the side edge of the playfield 100 using screws 384, adhesives, or the like. In still further embodiments, the side bracket 382 shown in FIG. 3F can be affixed to the outer side of the support rail 200 using adhesives, where the side channel 388 in FIG. 3F can be omitted as it would not be needed to mount the support rail 200. In any of these embodiments, as well as the embodiments shown in FIGS. 3D and 3E, the presence of a side bracket 382 to mount the support rail 200 can provide additional mechanical support to the support rail 200 and playfield edges.

In still further embodiments, the support rail 200 can be affixed to the top surface of a conventional support rail 110 (e.g., one made of wood and glued to the playfield edges), e.g., using an adhesive, appropriate fastening arrangements, or the like, to form a "hybrid" support rail. One or more channels 310, 386 in the support rail 200 can be provided and configured to enclose a light strip 350 and optionally to provide a base for mounting various accessories and mechanisms, as described herein below. In such embodiments, both the light strip(s) 350 and any mounted accessories can be installed and removed from the support rail 200 while it remains adhered or attached to the edge of the playfield 100.

In any of the embodiments described herein, the LEDs (or other light-emitting components) in the light strips 350 can be directed upward, at one or more angles toward the side of the support rail 200, or both. The LEDs can be provided in a single color or in a variety of colors, e.g., that coordinate with the artwork on the playfield 100. In some embodiments, the colors of individual LEDs can be controllable, using conventional control circuitry, to provide variations in brightness and/or color of the individual LEDs. Such variations can be controlled in coordination with other events and modes that occur during gameplay to enhance visual effects of the pinball machine. Power and/or control wiring used to activate the lighting strips 350 can be routed past the rearmost edge of the playfield 100 (the end closest to the backbox) and connected to a power source and optional light control circuitry beneath the playfield 100 or in the cabinet. Alternatively, such wiring can be routed through one or more holes provided near the side of the playfield 100 (e.g., beneath or adjacent to the mounted support rail 200), and connected to appropriate power and control sources affixed to the bottom surface of the playfield 100.

In still further embodiments of the disclosure, the cross-sectional shape of the support rail 200 can be provided in various geometries, and not only in a rectangular shape as illustrated for the embodiments described herein above.

Further exemplary cross-sectional shapes for the support rail, and various configurations of the channels 310, 320, 388, are shown in FIGS. 4A-4D, although embodiments of the disclosure are not limited to the specific shapes illustrated here. In these exemplary shapes, the bottom channel 320 (if present) can be used to mount the support rail 200 to the playfield 100 as shown, e.g., in FIGS. 3A and 3B, and optionally to further enclose a light strip 350. In any of these shapes, the bottom channel 320 can be configured to receive a light strip 350, as shown in FIG. 3D, or be replaced with a longitudinal hole 386 as shown in FIG. 3E, if a bracket 382 is used to affix the support rail 200 to the playfield 100 as shown, e.g., in FIGS. 3D and 3F, or if the support rail is affixed to the playfield 100 (or to a conventional side rail 110) using an adhesive or the like. The support rails 200 can be provided with one or more channels 310, 388 not located on the bottom of the support rail 200, e.g., located along the top and/or a side of the support rail 200, to provide mounting locations in various angles for accessories and/or game mechanisms, as described in further detail below.

In any of the embodiments described herein, the shape of a lower channel 320, 386 that is configured to enclose a lighting arrangement (e.g., a light strip 350), and the cross-sectional shape of the support rail 200 itself, can be varied along the length of the support rail 200. Such variation in the lower channel shape and/or support rail 200, together with the geometry and placement of LEDs on the light strip 350, can be used to provide a variety of lighting effects along the support rail 200, including variations in intensity and dispersion of the emitted light. For example, the depth of the cabinet above the playfield 100 is typically larger in the upper portion of the playfield closer to the backbox than at the end closer to the player. Accordingly, the height of the support rail 200 can also be greater in the rear portion of the playfield 100. Such increased height can provide more lighting intensity and variations, e.g., if more than one channel 310, 388 is provided in the taller portion of the support rail 200 to enclose more than one light strip 350. For example, in any of the embodiments described herein, a plurality of light strips 350 can be provided in one or more channels 310, 388 of a support rail 200 to provide increased illumination intensity. Such light strips 350 (and/or individual light-emitting elements in a single light strip 350) can be provided in varying orientations, e.g., to produce a wider dispersion of illumination or to direct light towards one or more particular areas of the pinball machine.

In still further embodiments, reflective elements (not shown) can be provided adjacent to and/or within channels 310, 320, 388 of the support rail 200 to further direct light emitted by the one or more light strips 350 provided within such channels. For example, a reflective material or coating can be provided along portions of the bottom surface, along the outer surface, and/or within any of the channels 310, 320, 388 of a support rail 200 to direct more light in a desired direction, such as upward and/or onto the playfield. In another embodiment, if a mounting bracket 382 such as those shown in FIGS. 3D-3F is used, a portion or all of the surface of the bracket 382 adjacent to the support rail 200 can be provided with a reflective surface to direct more light emitted by the light strip 350 towards the playfield 100 and/or to other surfaces of the support rail 200. In still further embodiments, a reflective material can be provided along the inside wall of the cabinet, adjacent to the light rail 200 when the playfield 100 is in its normal position during use, to also direct more light towards the playfield 100.

In other embodiments, one or more surface regions of the support rail 200 can be roughened, etched, laser patterned, abraded, or the like, to modify the light transmission and dispersion properties of the support rail 200. For example, interior surfaces of a channel 310, 320, 388 containing a light strip 350 can be non-smooth to provide better local dispersion of light from the LEDs on the light strip 350, thereby reducing visibility or glare of individual LEDs. Combinations of surface textures, reflective materials on or adjacent to surfaces, and geometry of the support rail 200 can be used to provide a variety of desired light dispersion properties.

Figure 5A:
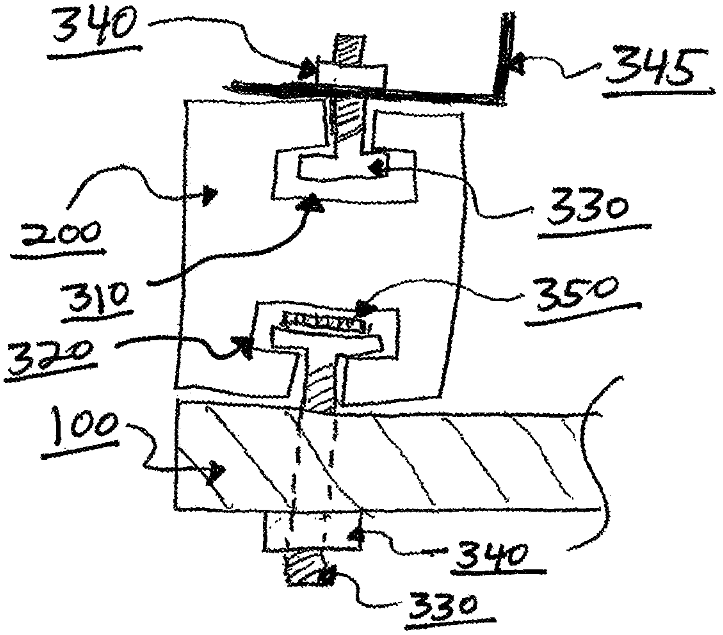
FIG. 5A is a cross-sectional illustration of a support rail having a channel used to mount the rail to a playfield and containing an illuminating arrangement, and another channel with a bracket secured thereto for mounting other components to the rail.

In various embodiments of the disclosure, optional channels 310, 388 provided on outer surfaces of a support rail 200 can be used to mount various components, such as playfield mechanisms or decorative accessories, to the support rail 200. An exemplary mounting configuration is shown in FIG. 5A, in which a nut 340 and a bolt 330 placed within the upper channel 310 of a support rail 200 are used to affix a bracket 345 to the support rail 200. The bracket 345 can be affixed to a playfield mechanism (e.g. a spinner target suspended over the playfield 100, a ball guide, etc.) or to a decorative accessory (e.g. a 2-D or 3-D plastic figurine or the like). The channel 310 is preferably open at least one end of the support rail 200, such that the bracket 345 and mounting hardware can be slid into the channel 310 and positioned anywhere along the channel 310, and then tightened to secure the bracket 345 at a particular location along the support rail 200. In further embodiments, the bracket 345, portions of the mounting hardware, and/or the accessory or mechanism can be provided as a single unitary component. Mounting of features on the channel 310 can provide ease of installation/removal and flexibility in positioning of mounted components on the support rail 200. Such positioning flexibility can be used, e.g., for decorative customization of the pinball machine or to facilitate relocation of mounted mechanisms relative to the playfield 100.

Figure 5B:
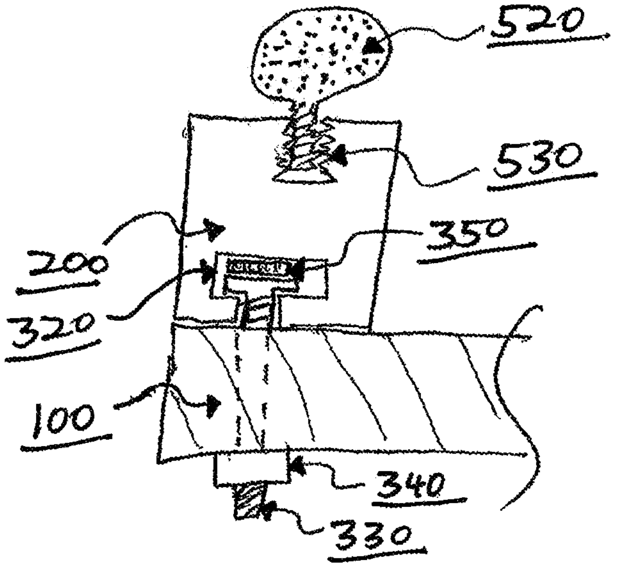
FIG. 5B is a cross-sectional illustration of a support rail having a channel used to mount the rail to a playfield and containing an illuminating arrangement, and a threaded hole with a component mounted to the rail using the hole.

In another exemplary embodiment, one or more threaded holes 530 can be provided on an exposed surface of the support rail 200 as illustrated in FIG. 5B. This mounting configuration can be used to affix game mechanisms or decorative objects 520 to a particular location on the support rail 200, where such mechanisms or objects 520 can be provided with a threaded stud or the like configured to screw into the threaded hole 530. Although most embodiments described herein show a channel 310, 388 that can be used for mounting various objects to the support rail 200, the support rail 200 can include threaded holes 530 instead of, or in addition to, channels 310, 388 to provide more options for mounting components to the support rail 200. Thus, certain embodiments of the disclosure may include support rails 200 that do not contain a channel 310, 388, e.g., if an alternative fastening arrangement is used to affix the support rail 200 to the playfield 100 (e.g. a bracket 382 and/or adhesive), and alternative mounting arrangements are used to affix components to the support rail.

Figure 5C:
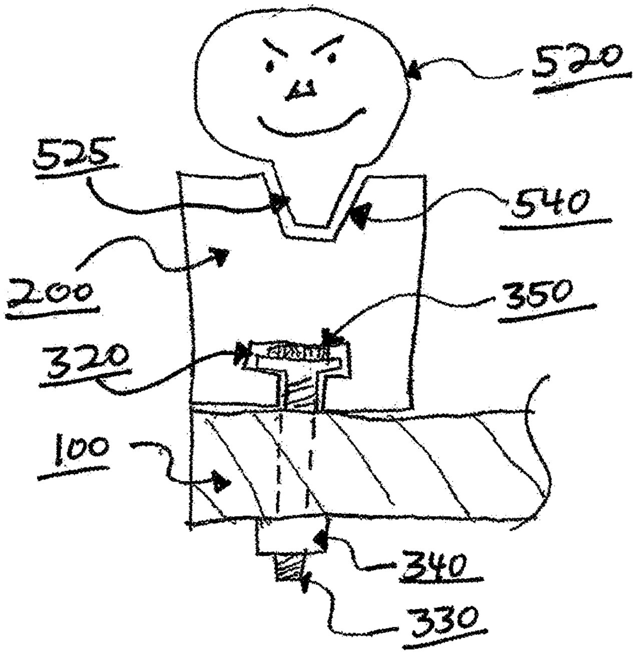
FIG. 5C is a cross-sectional illustration of a support rail having a channel used to mount the rail to a playfield and containing an illuminating arrangement, and a tapered hole with a component mounted to the rail using the hole.

In further embodiments, non-threaded holes can also be used to affix certain components to the support rail. For example, a tapered hole 540 can be provided in the support rail 200, and a matching tapered protrusion 525 can be provided on an object 520 or bracket 345 to be mounted to the support rail 200, as shown in FIG. 5C. This exemplary peg/hole mounting configuration can employ friction to retain a mounted object 520 in place, while facilitating variation in its rotational orientation. Alternatively, an adhesive can be used to more permanently affix a component's peg 525 to a hole 540 in the support rail 200, where the location of the hole 540 ensures more precise placement of the mounted component 520. In further embodiments, the mounting hole 540 and the mounting peg 525 need not be tapered. For example, they can be provided with uniform circular cross sections, which allows for rotational movement/adjustment of the object 520 when affixed to the support rail 200. Alternatively, the peg 525 and hole 540 may have matching cross-sectional shapes that are not circular, such as square or triangular shapes. Such shapes can be used to limit the positioning of the object 520 at a plurality of discrete orientations relative to the support rail 200 and playfield 100.

Figure 5D:
FIG. 5D is a front view of a decorative feature configured to be mounted in a T-shaped channel of a support rail.
Figure 5E:
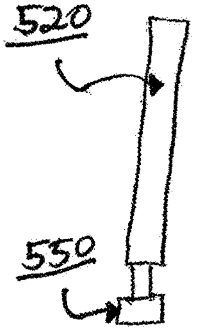
FIG. 5E is a side view of the decorative feature shown in FIG. 5D.

A mountable component 520 can also be provided with a T-shaped protrusion 550 on its base, as illustrated in the front and side views of FIGS. 5D and 5E. The T-shaped end of this protrusion 550 can be placed in a channel 310, 388 and then, e.g., rotated a quarter turn (90 degrees) to lock the component 520 in place on the support rail 520. The protrusion 550 can be shaped such that the rotated component 520 is held firmly in place by friction on the support rail 200.

Figure 5F:
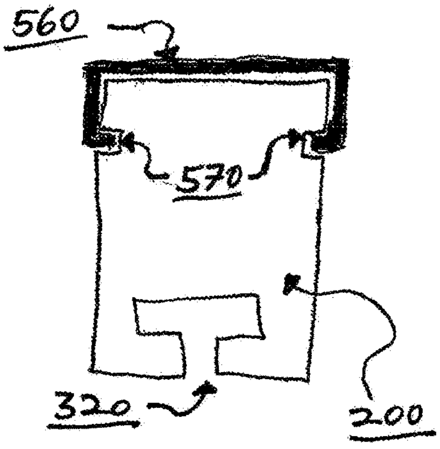
FIG. 5F is a cross-sectional illustration of a support rail having side grooves that couple to a bracket that can be used to mount components to the rail.

In a further embodiment, longitudinal grooves 570 can be provided on an outer surface of the support rail 200, as shown in FIG. 5F. An appropriately-shaped bracket 560 can be provided, optionally with a mechanism or decorative accessory affixed thereto, such that the ends of the bracket 560 fit inside the grooves 570. This configuration facilitates sliding of the bracket 560 onto and along the support rail 220, such that the bracket 560 and any object or component affixed thereto can be held in place on the support rail 200. The location of the bracket 560 along the length of the support rail 200 can be stabilized by friction, an adhesive, protrusions or endpoints of the grooves 570, and/or small screws, pegs, or other hardware that can be affixed to the support rail 200 to restrict movement of the bracket 560 once it is in place. The surface of the support rail 200 and corresponding shape of the mounted bracket 560 need not be flat or rectangular as illustrated in FIG. 5F, but optionally can be made to have any compatible shapes that facilitate the described mounting technique.

In still further embodiments, at least a portion of a mounted component 520 or bracket 560 can be made from a transparent or translucent material. In this manner, light emitted by a light strip 350 can pass through the support rail 200 and illuminate the component 520 or bracket 560. For example, in one embodiment, one or more LEDs on a light strip 350 that are proximal to such a mounted component 520 can be controlled, with respect to intensity and/or color, to selectively illuminate the particular component 520. Brackets 560 or reflective/opaque materials can also be provided on or along portions of the support rail 200 in any of the embodiments described herein, such that more light can be directed toward a particular component and provide less general illumination to the nearby playfield.

In further embodiments, some mechanisms, brackets, and/or decorative accessories can be affixed to the support rail using adhesives instead of or in addition to mounting configurations that use channels, threaded holes, or non-threaded holes as described herein.

In still further embodiments of the disclosure, a kit can be provided that is configured to be installed in a pinball machine and provide the various benefits described herein. For example, an exemplary kit suitable for installation in an existing pinball machine can include, e.g., one or two (or more) support rails 200, appropriate mounting hardware or materials to affix the support rail(s) 200 to a playfield, and one or more light strips 350 configured to fit into a channel 310, 320, 386, 388 in the support rail 200. In some embodiments, a support rail 200 can be provided that is configured to be adhered or otherwise affixed to the top of an existing conventional (e.g. wooden) support rail 110 to provide many of the benefits described here to older playfields that include such support rails 110.

The light strip 350 can be provided with appropriate electrical conductors and connectors (e.g. wiring with end clips or the like), such that the light strip 350 can be powered by existing power sources within the pinball machine. Optionally, control circuitry may also be provided to facilitate control of parameters (e.g. intensity, color) of one or more of the individual light-emitting elements of the light strip 350. Such control can be performed by game software itself, or it may be user-controllable via a hardwired or wireless control pad, or the like.

The kit can also include one or more brackets 345, 560 or other pieces of mounting hardware that are configured to be mountable on the support rails 200 as described herein, or in any comparable manner, and such components can optionally be provided separately. Such brackets 345, 560 may include a figurine 520 or other decorative object, such as one compatible with the design or theme of the particular game. Alternatively, a plain bracket 345, 560 can be provided with a surface to which arbitrary objects can be affixed, giving a user greater freedom to customize their game by mounting objects to the support rail 200 (using the bracket 345, 560) without interfering with or obstructing gameplay on the playfield 100.

Such kits can provide improved illumination of existing games, and would not create any placement difficulties as the support rails 200 can be made in the same size as existing (generally wooden) support rails 110 already present in most games. The support rails 200 and kits described in the present disclosure can also facilitate customization of games, providing a simplified mounting platform that does not interfere with ball movement. These support rails 200 and kits can optionally provide for lighted decorations if the bracket 345, 560 and/or the decorative object 520 are at least partially transparent or translucent, allowing light from the light strip 350 to pass through the support rail 200 and into the bracket 345, 560 and/or mounted decoration 520.

Any of the various materials, geometries, channel shapes, numbers of features (e.g. channels, light strips), and arrangements for mounting of the support rail 200 to the playfield 100 (or to an existing conventional support rail 110) and for mounting of components to the support rail 200 that are described herein can be used in any desired combination in accordance with the disclosure. Further, the described support rails 200 and associated features can be provided as a retrofit to older games to provide the various benefits described herein (e.g. improved lighting, playfield support, decorative customization, etc.). The embodiments of the disclosure as described herein can also be used to provide similar benefits to other arcade games and entertainment devices in addition to pinball machines.

The foregoing merely illustrates the principles of the exemplary embodiments of the present disclosure. Other variations to the exemplary embodiments can be understood and effected by those skilled in the art in practising the claimed invention from a study of the drawings, the disclosure, and the appended paragraphs. The mere fact that certain features are described in different paragraphs and/or illustrated in different figures does not indicate that any combination of these features cannot be used advantageously. Various modifications and alterations to the described exemplary embodiments will be apparent to those skilled in the art in view of the teachings herein. It will thus be appreciated that those skilled in the art will be able to devise numerous techniques which, although not explicitly described herein, embody the principles of the invention and are thus within the spirit and scope of the present disclosure.

What is claimed is:

1. A pinball playfield, comprising:

a support rail affixed to and in direct contact with at least a portion of one side of a pinball playfield to provide mechanical support thereto, wherein the support rail comprises an elongated strip that further comprises a plurality of light-emitting elements.

2. The pinball playfield of claim 1, wherein the support rail further comprises a mounting arrangement comprising at least one of a channel provided longitudinally along an outer surface of the support rail, or at least one hole extending into an outer surface of the support rail, wherein the mounting arrangement is configured to receive and facilitate affixing of at least one of a bracket, a game mechanism, or a decorative object to the support rail.

3. The pinball playfield of claim 2, wherein the at least one hole has a non-circular cross section corresponding to the shape of a protrusion on an object, to facilitate mounting of the object onto the support rail at a particular relative orientation.

4. The pinball playfield of claim 2, wherein the at least one hole is threaded and configured to receive a threaded stud affixed to an object, to facilitate mounting of the object onto the support rail.

5. The pinball playfield of claim 2, wherein the support rail further comprises at least one of the game mechanism or the decorative object affixed thereto, and wherein at least a portion of the light-emitting elements are configured to be controlled to selectively illuminate the at least one of the game mechanism or the decorative object with respect to at least one of intensity or color.

6. The pinball playfield of claim 1, wherein the light-emitting elements are LED elements.

7. The pinball playfield of claim 1, wherein the support rail comprises at least one channel having a cross-sectional T shape, and wherein the at least one channel is configured to both at least partially enclose the elongated strip, and receive mounting hardware configured to affix the support rail to the playfield.

8. The pinball playfield of claim 1, wherein the support rail is configured to be affixed to the pinball playfield using a bracket.

9. The pinball playfield of claim 1, wherein at least a portion of a surface of the support rail is reflective.

10. The pinball playfield of claim 1, wherein the elongated strip is provided within a hole that extends longitudinally through at least a portion of the support rail.

11. The pinball playfield of claim 1, wherein the support rail comprises a strip of wood affixed to and extending along a side edge of the playfield, and wherein the elongated strip is affixed directly to a top surface of the strip of wood.

12. The pinball playfield of claim 1, wherein a cross-sectional shape of the support rail is non-rectangular.

13. The pinball playfield of claim 1, wherein at least one of an intensity or a color of the plurality of light-emitting elements is configured to be controlled using lighting control circuitry.

14. The pinball playfield of claim 1, wherein the support rail comprises a plurality of the elongated strips.

* * * * *